(12) United States Patent
Wong

(10) Patent No.: US 11,035,519 B2
(45) Date of Patent: Jun. 15, 2021

(54) GRINDER AND TOOL REST SYSTEM

(71) Applicant: Valtra Inc., Santa Fe Springs, CA (US)

(72) Inventor: Harry Wong, Pasadena, CA (US)

(73) Assignee: Valtra Inc., Santa Fe Springs, CA (US)

( * ) Notice: Subject to any disclaimer, the term of this patent is extended or adjusted under 35 U.S.C. 154(b) by 96 days.

(21) Appl. No.: 16/592,548

(22) Filed: Oct. 3, 2019

(65) Prior Publication Data
US 2021/0102660 A1    Apr. 8, 2021

(51) Int. Cl.
| F16M 13/02 | (2006.01) |
| B24B 41/00 | (2006.01) |
| B23K 37/02 | (2006.01) |
| F16B 1/00 | (2006.01) |

(52) U.S. Cl.
CPC ........... *F16M 13/022* (2013.01); *B23K 37/02* (2013.01); *B24B 41/00* (2013.01); *F16B 1/00* (2013.01); *F16B 2001/0035* (2013.01); *F16M 2200/06* (2013.01)

(58) Field of Classification Search
CPC combination set(s) only.
See application file for complete search history.

(56) References Cited

U.S. PATENT DOCUMENTS

| 2,884,698 | A | * | 5/1959 | Wursch | B23K 37/0435 33/500 |
| 2,888,965 | A | * | 6/1959 | Phillips | B25H 1/0078 144/1.1 |
| 4,303,054 | A | * | 12/1981 | Lore | B24B 41/00 125/11.01 |
| 4,411,411 | A | * | 10/1983 | Barthelmess | B23K 7/10 266/66 |
| 5,123,619 | A | * | 6/1992 | Tomlinson | F16L 3/08 24/16 R |
| 5,400,479 | A | * | 3/1995 | Medina | H01F 7/0263 24/303 |
| 6,467,744 | B1 | * | 10/2002 | Calin | B66F 13/00 248/214 |
| 7,959,140 | B2 | * | 6/2011 | Wong | B25B 11/002 269/8 |
| 8,789,821 | B2 | * | 7/2014 | Wong | B23K 37/0435 269/8 |
| 2010/0147122 | A1 | * | 6/2010 | Hurt | F16M 13/02 83/34 |

* cited by examiner

*Primary Examiner* — Monica E Millner
(74) *Attorney, Agent, or Firm* — Jen-Feng Lee, Esq.

(57) ABSTRACT

Present invention teaches tool rest system having a magnetic base and a height-and-angle adjustable arm with a platform situated at the top portion of the arm, for working on the surface of a welding table with ferromagnetic attribute. An anti-tipping plate provides the anti-tipping power when a large or heavy load is placed upon the platform on the arm that is adjustable by two screws. Additional features of cable hanger and storage box adds to the convenience of use for welding work.

5 Claims, 11 Drawing Sheets

GRINDER AND TOOL REST SYSTEM

FIELD AND BACKGROUND OF THE INVENTION

Present invention disclosed a rest system for grinder tools, welding tools and similar tools where a worker can easily rest the tools on the system during a work session, especially when the work is performed on a welding table.

Particularly, the rest system utilizes a magnetic base that works well with most welding tables, since most welding tables are made of metal with magnetic attribute.

Additional features of cable hanger and storage box adds to the convenience of use for welding work.

SUMMARY OF THE INVENTION

The invention relates to tool holding and rest system for use in welding industry. Particularly, on welding table with magnetic capacity, the magnetic base of the tool rest system can easily sit on and hold on to the surface of a welding table and make work process of a welding session easier.

The present tool rest system can be used for holding electric grinders, MIG and TIG torches and other related tools.

The basic components of the present invention comprise a magnetic base, an anti-tipping plate with two screws and two wing nuts, and a height-and-angle adjustable arm. The arm and the anti-tipping plate are fixed to the magnetic base by a vertical screw inserted through a bottom hole and elongated slot to a threaded hole on the magnetic base.

The present invention can be attached to the surface of a welding table easily and conveniently since welding table surface is made of ferromagnetic material. With the help of 2 screws and 2 wing nuts, anti-tipping plate will provide an anti-tipping action to the present invention even a heavy load is attached on platform of height-and-angle adjustable arm.

The horizontal position of anti-tipping plate relative to magnetic base is adjustable over the elongated slot. This design feature increases the flexibility of the present invention to work for large variety of loads mounted on platform. The horizontal angle of anti-tipping plate is also adjustable to align with the angle of the load on platform.

The height and angle of the platform is adjustable by controlling the higher screw and the lower screw.

Additional elements of cable hanger, tool box/storage and holding places are also introduced in various implementations introduced herein, all of which add to the convenience of the invention for different applications and purposes, as will be disclosed in more details below.

DESCRIPTION OF THE DRAWINGS

The accompanying drawings exemplify the preferred embodiments of the invention. Together with the description, serve to explain the principles of the invention.

A brief description of the drawings is as follows.

DETAILED DESCRIPTION OF THE PREFERRED EMBODIMENT

Figure 1:
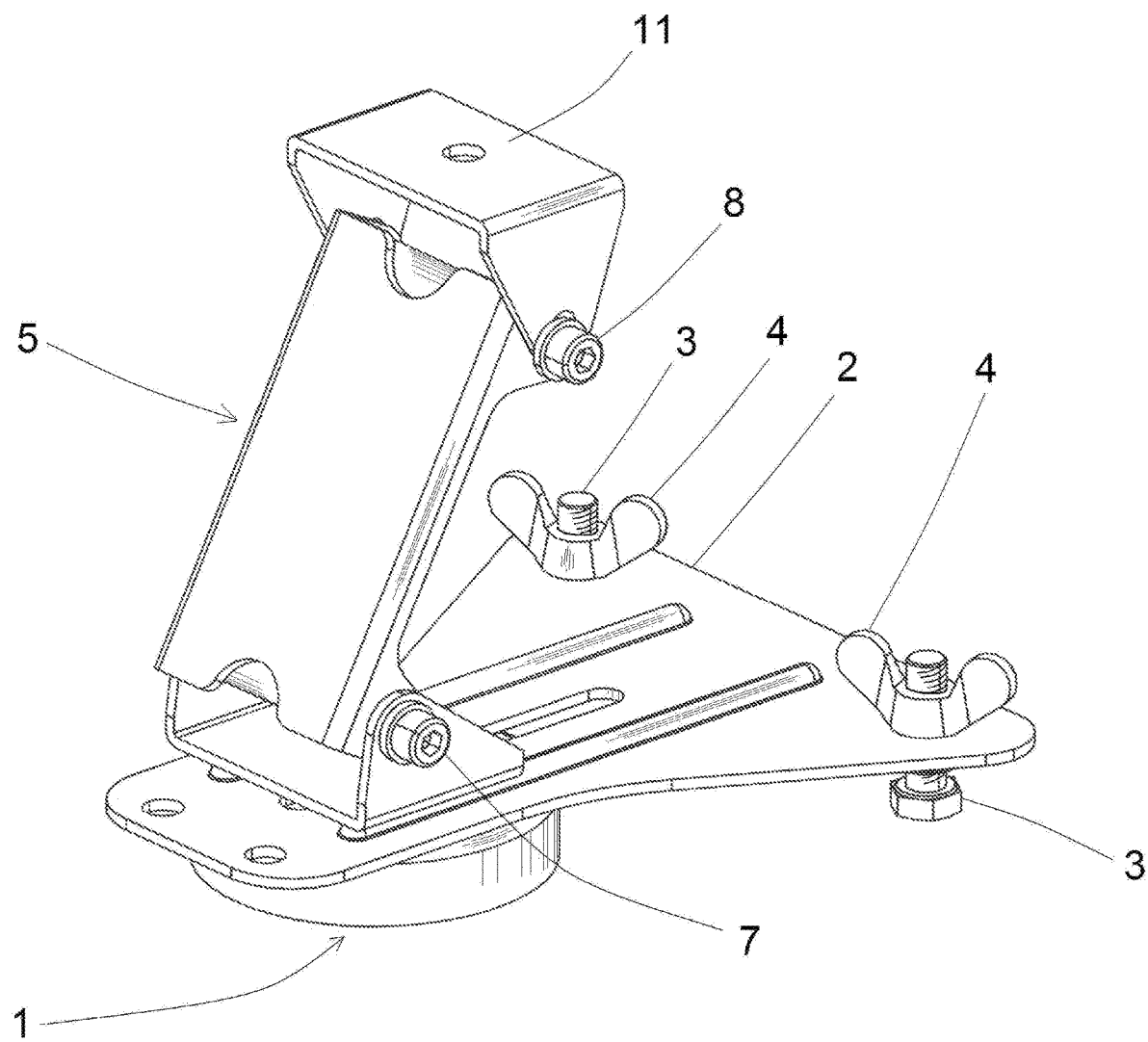
FIG. 1 is the perspective view of the primary structures of present invention.

The implementation of present invention is primarily composed of a magnetic base 1, upon which an anti-tipping plate 2 is placed. The anti-tippling plate 2 has two screws 3 with matching wingnuts 4. The anti-tipping plate 2 further has at least an elongated slot 9, through which a vertical screw 6 is inserted to secure the anti-tipping plate 2 to the magnetic base 1. See FIGS. 1 and 2.

A height-and-angle adjustable arm 5 sits on top of the anti-tipping plate 2. The height-and-angle adjustable arm 5 has a bottom hole 10. The vertical screw 6 is inserted through the bottom hole 10, to secure the height-and-angle adjustable arm 5 and the anti-tipping plate 2 to the magnetic base 1.

The magnetic base 1 further comprising a round cup 31 made of ferromagnetic material, a cover plate 32 made of non-magnetic materials, a layer of adhesive material 33 and a donut-shaped permanent magnet 34 inside the cup 31.

A threaded hole 35 is located at a top center point on the magnetic base 1 and serves to receive the vertical screw 6.

Figure 4:
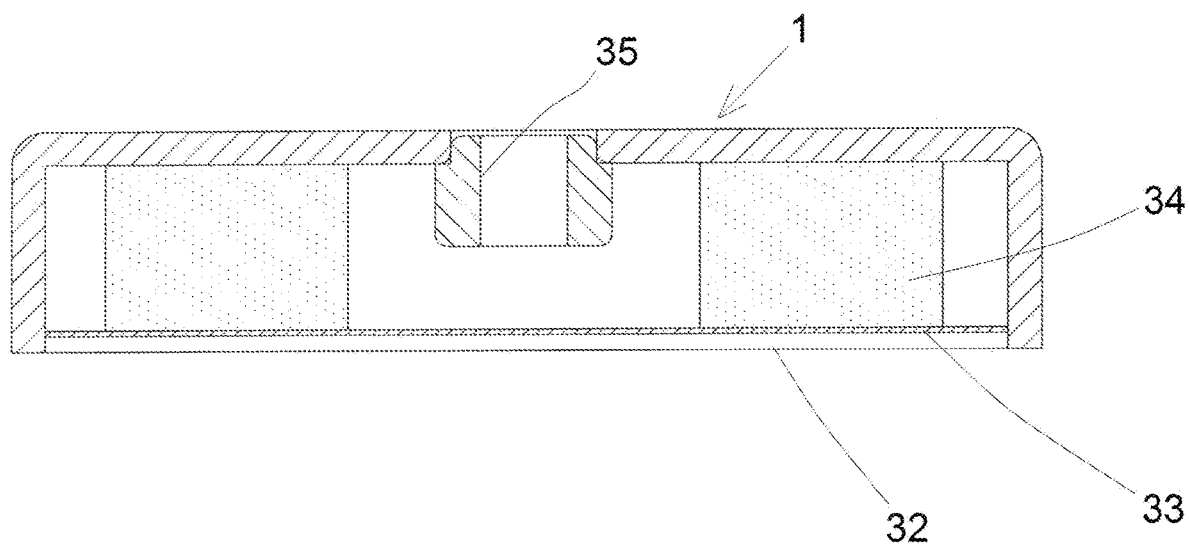
FIG. 4 is the cross-section (profile) view of the magnetic base, along cut line A-A noted in FIG. 3.

FIG. 4 provides the profile cross-section view of the magnetic base 1, along cut line A-A.

Figure 2:
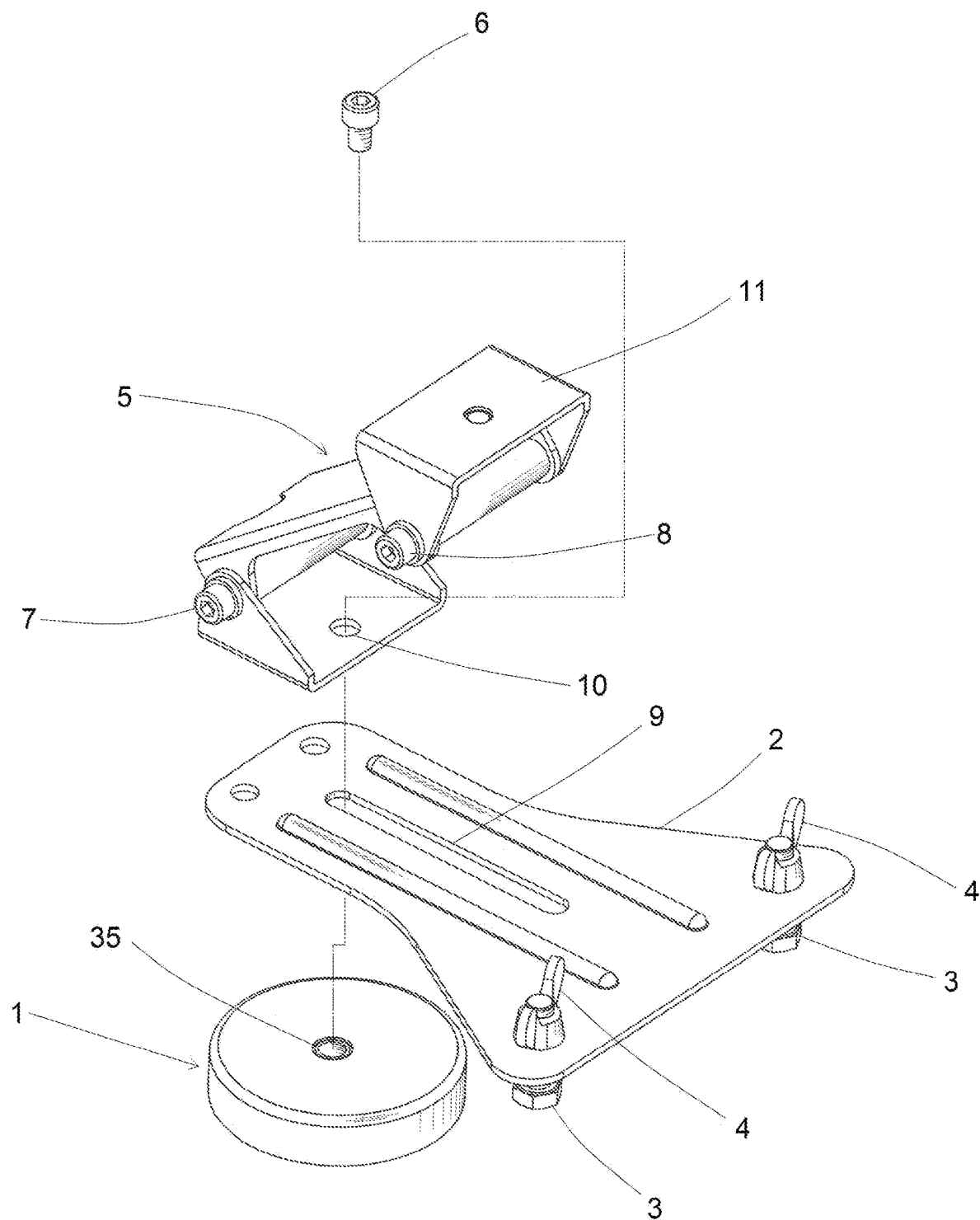
FIG. 2 is the exploded view of present invention, showing the main components.
Figure 3:
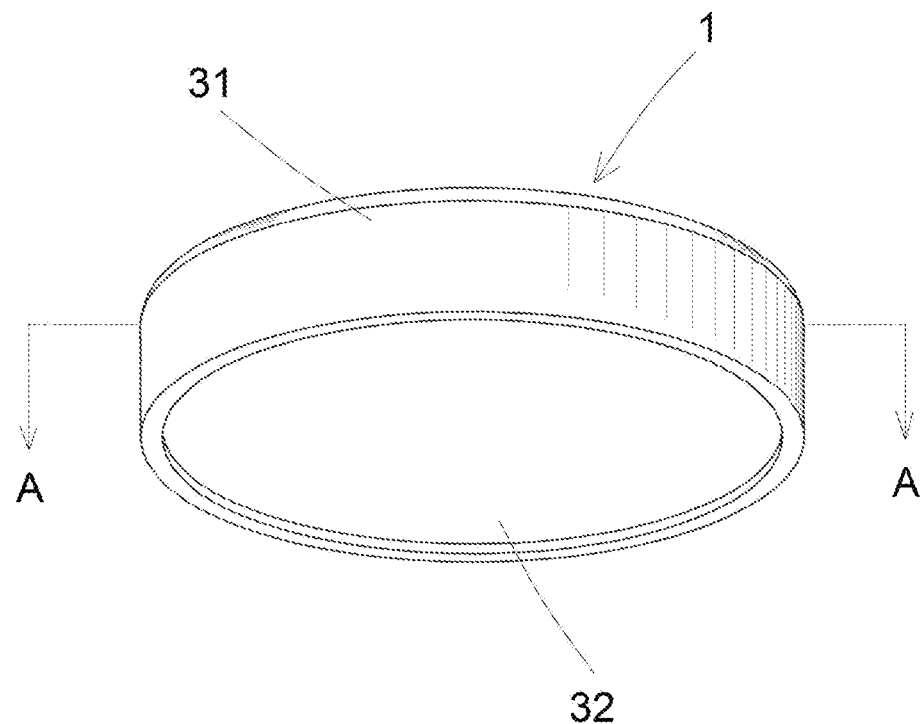
FIG. 3 shows the bottom view of the magnetic base.

A platform 11 connects to a top portion of the height-and-angle adjustable arm 5. The height-and-angle adjustable arm 5 has a lower screw 7 and a higher screw 8, as shown in FIGS. 1-2, to adjust the desired height and angle of platform 11.

The horizontal position of anti-tipping plate 2 relative to the magnetic base 1 is adjustable over slot 9. This design feature increases the flexibility of the present invention to work on large variety of loads placed on platform 11. The horizontal angle of anti-tipping plate 2 is also adjustable to align with the angle of the loads on platform 5.

Another implementation of the grinder and tool rest system contains, in addition to the elements described hereinabove, a grinder bracket 51 and a cable hanger 52. The cable hanger 52, as well as later variations introduced herein, generally has a U-shaped formation to fit to a pin and is slidable over said pin 55, as will be made clear in the drawings and description below. The later variations of different brackets also have a pin serving the same purpose to allow the cable hanger 52, and variations, to slidably move about.

Figure 5:
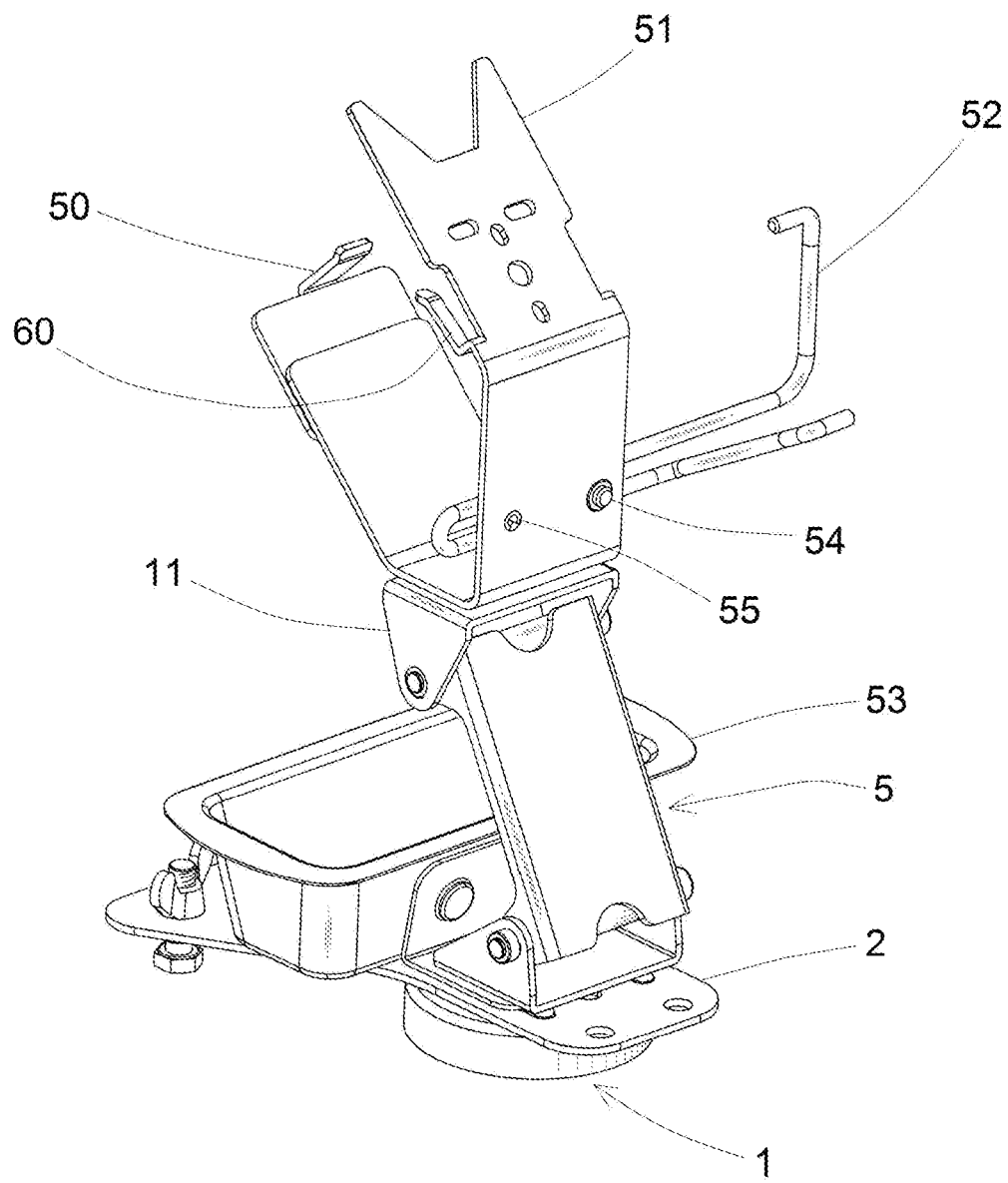
FIG. 5 shows a grinder rest system for holding an electric grinder.

As shown in FIG. 5, the grinder bracket 51 is mounted on the platform 11 of the height-and-angle adjustable arm 5. A part storage 53 is mounted on the anti-tipping plate 2.

The cable hanger 52 is slidable over a pin 55. The position of the cable hanger 52 can be set as desired by sliding over and relative to the pin 55 and can be set by a locking screw 54. Additionally, the grinder bracket 51 has a disc hook 50 on one end, and a key hook 60 on the other end.

Another implementation of the present invention forgoes the anti-tipping plate 2. This implementation is primarily used for a TIG welding torch because the TIG torch is light in weight and small in size; there is no need for an anti-tipping plate.

Figure 6:
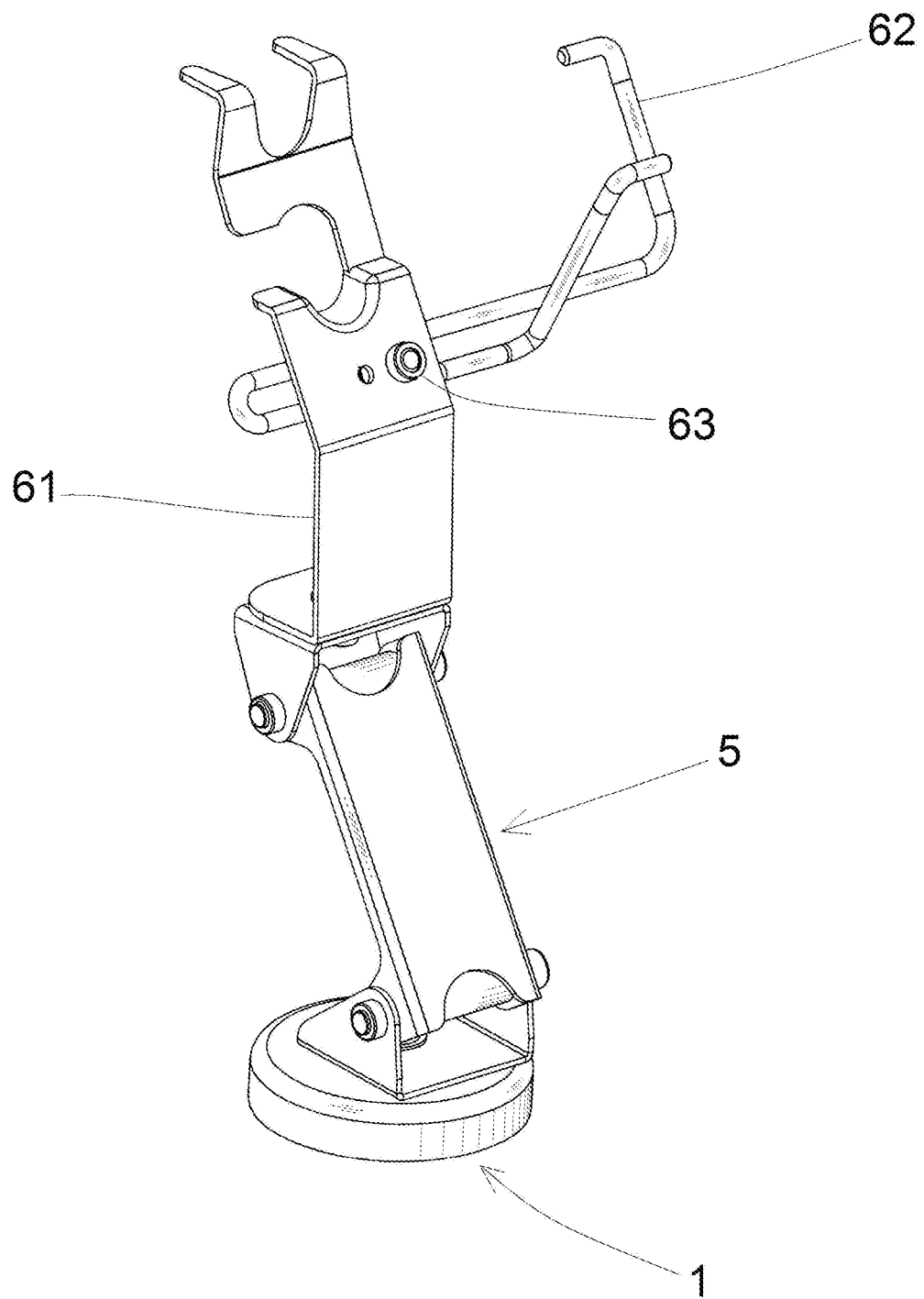
FIG. 6 shows a TIG torch rest system.

As shown in FIG. 6, a height-and-angle adjustable arm 5 is secured to the magnetic base 1. The platform 11, on the top portion of the height-and-angle adjustable arm 5, is then mounted with a torch bracket 61.

A vertical screw 6 is placed through a bottom hole 10 of the height-and-angle adjustable arm and is secured into a threaded hole 35 in the top center position on the magnetic base 1.

Similar to the description given earlier, the height and angle of the torch bracket 61 can be adjusted by a higher screw 8 and a lower screw 7 on the height-and-angle adjustable arm 5.

Figure 6A:
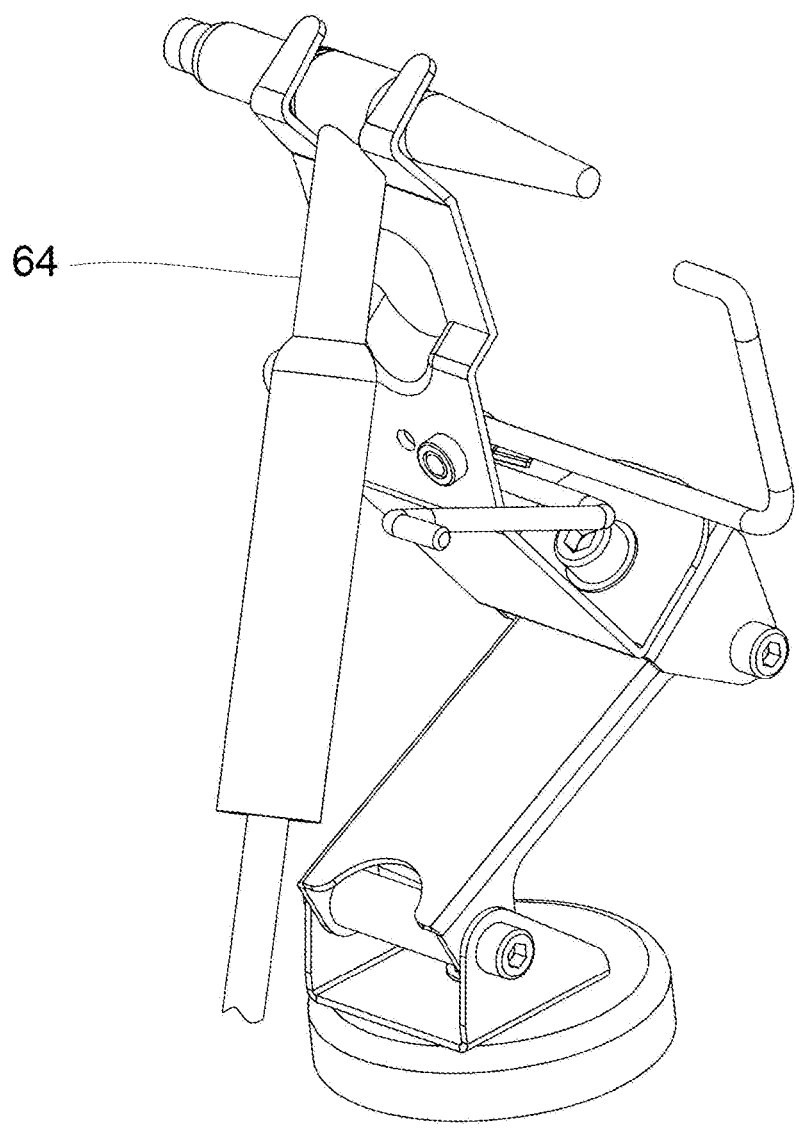
FIG. 6*a* shows a TIG torch is being hanged on the torch bracket.

FIG. 6a shows a TIG torch is being hanged on the torch bracket.

Figure 7:
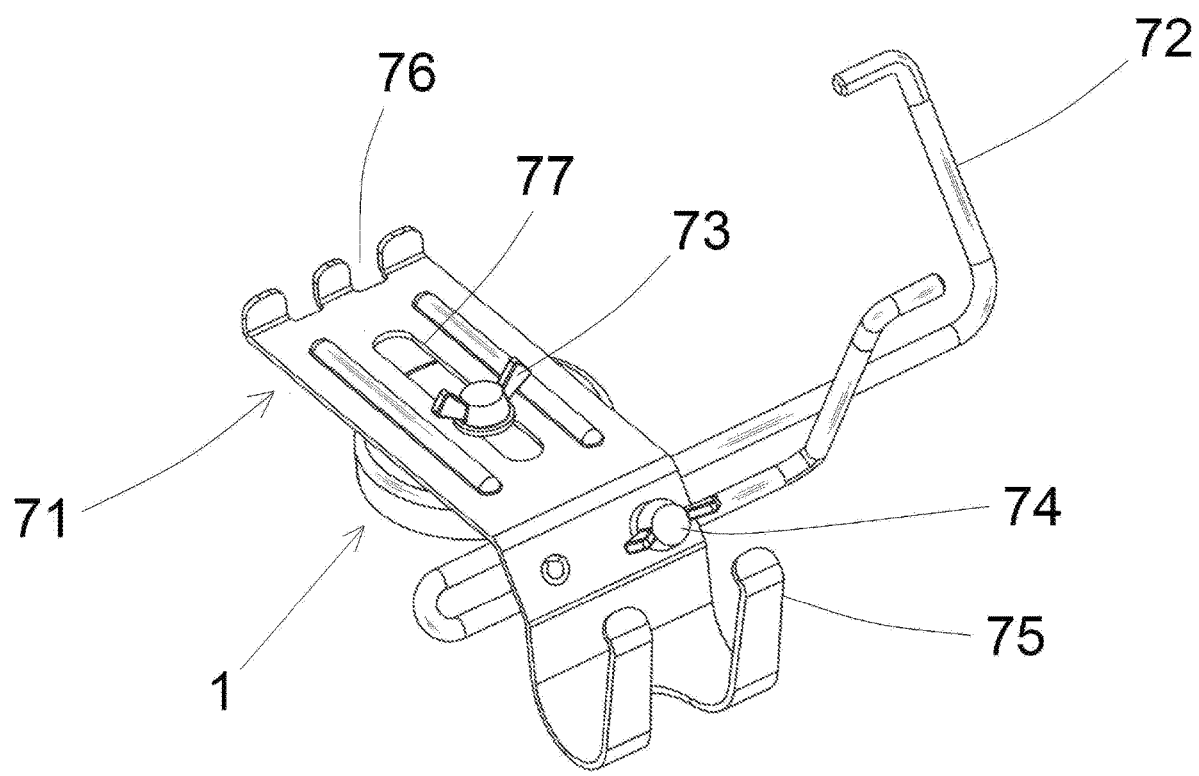
FIG. 7 shows a table edge torch rest system.

FIG. 7 shows another implementation of a torch rest system, comprising of a magnetic base 1 and a torch holding bracket 71. This simplified implementation forgoes the anti-tipping plate 2 and the height-and-angle adjustable arm 5.

The torch holding bracket 71 has an elongated hole 77, a cable hanger 72 slidable over a pin. The position of the cable hanger 72 can be set by a first wingnut 74.

A second wingnut 73 serves to lock the torch holding bracket 71 to the magnetic base via the elongated hole 77.

The torch holding bracket 71 further has a first end 75 shaped like a fork for holding tools and a second end 76 for storing filler rods or materials.

Figure 8:
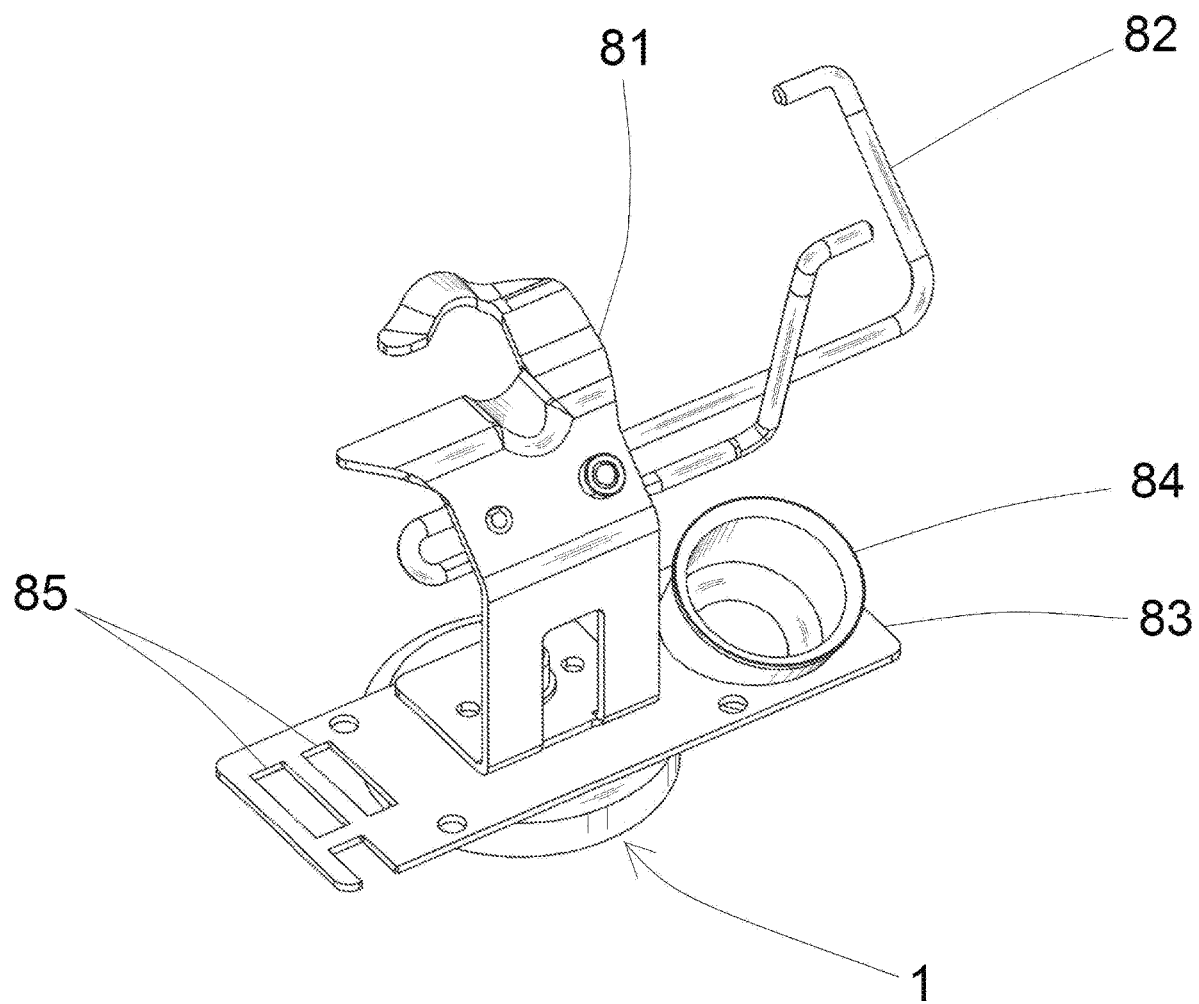
FIG. 8 shows a MIG torch rest system.

The torch rest system additionally may have an accessory plate 83 placed in between the magnetic base 1 and the bottom portion of a torch bracket 81, as shown in FIG. 8.

A gel pot 84 is made to one side of the accessory plate 83 and a plurality of holes 85 are made on the other side of the accessory plate 83.

A cable hanger 82 is slidable over a pin, with a locking screw for setting the desired position of the cable hanger 82.

Figure 9:
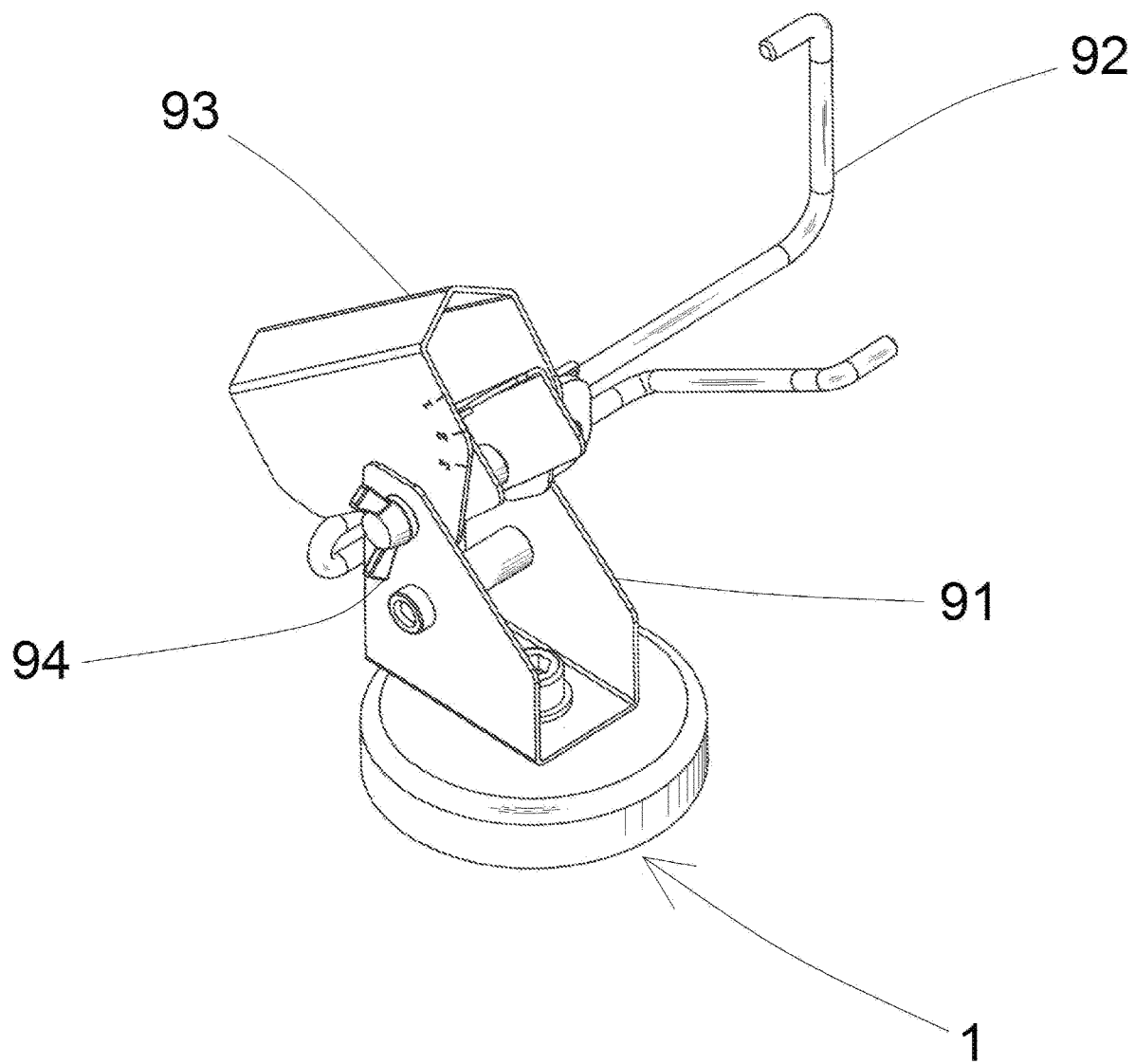
FIG. 9 shows a universal rest mounted on a magnetic base directly.

Another simplified implementation of the present invention consists of a magnetic base 1, a triangular bracket 91 and a torch holder 93, as shown in FIG. 9.

The triangular bracket 91 is secured to the magnetic base 1 via vertical screw 6 as discussed earlier. The angle of torch holder 93 is adjustable by wing screw 94.

Figure 10:
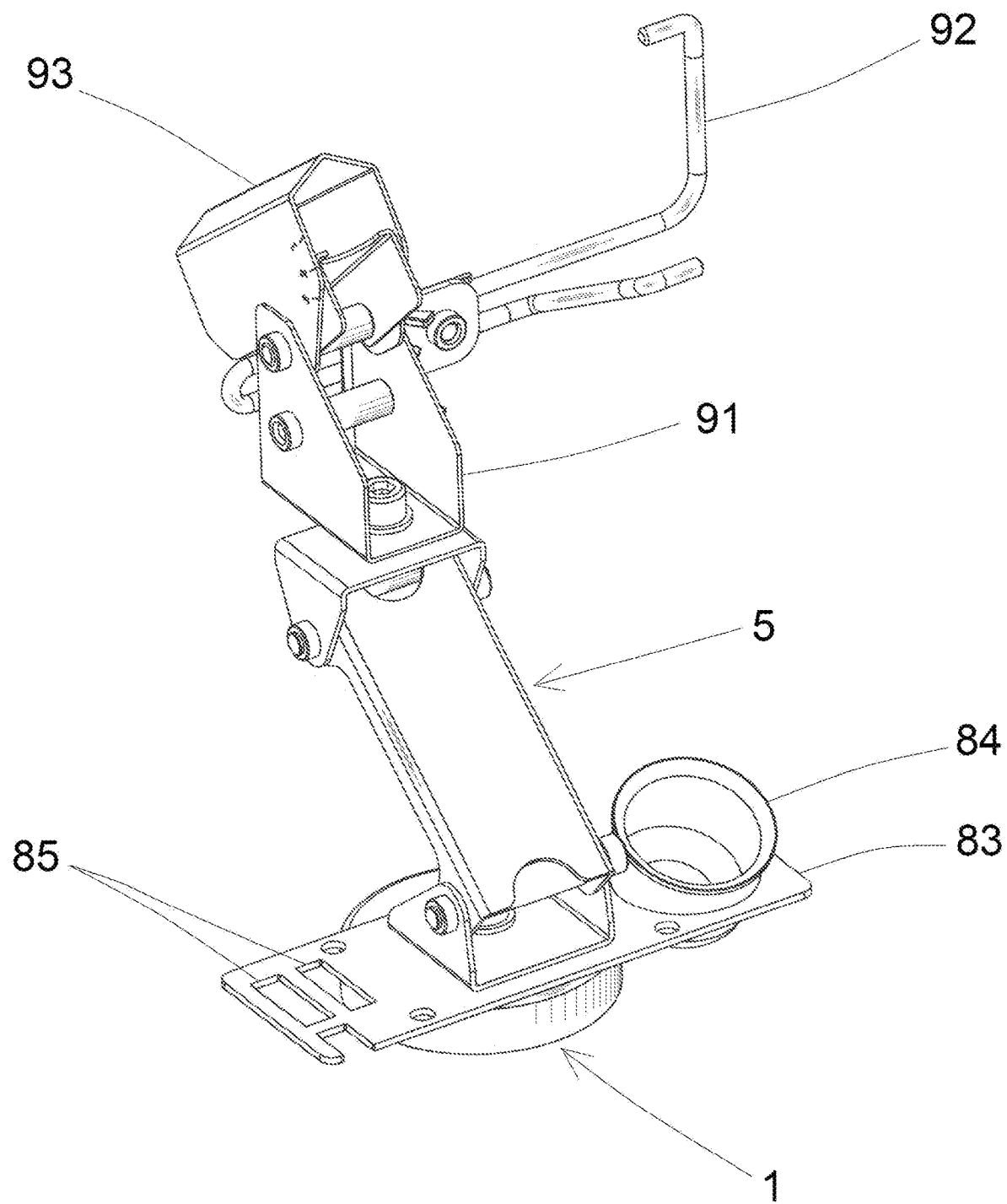
FIG. 10 shows a universal rest mounted to a magnetic base through a height-and-angle adjustable arm through an accessory plate.

Another implementation, in FIG. 10, shows the universal rest mounted to the magnetic base 1 through the height-and-angle adjustable arm 5 with an accessory plate 83 added. After a welding operation, the TIG torch, the MIG torch or the electrode can be inserted to the torch holder 93 and the cable wrapped around the cable hanger 92. Gel pot 84 is used to hold the welding gel and it is fixed on accessory plate 83 at an angle for easy access. Two rectangular holes 85 are made on accessory plate 83 for parking the pliers or other hand tools.

The invention claimed is:

1. A grinder and tool rest system, comprising:
    a magnetic base;
    an anti-tipping plate having 2 screws with matching wingnuts, said anti-tipping plate has at least one elongated slots;
    a height-and-angle adjustable arm;
    a platform connected to a top end of the height-and-angle adjustable arm; and
    a vertical screw, where the vertical screw is placed through a bottom hole of the height-and-angle adjustable arm, through the at least one elongated slots of the anti-tipping plate and is secured into a threaded hole in the top center point on the magnetic base, and where the height and angle of the platform are adjusted by a lower screw and a higher screw.

2. The grinder and tool rest system of claim 1, wherein the magnetic base further comprising a round cup made of ferromagnetic material, a cover plate made of non-magnetic materials, a layer of adhesive material and a donut-shaped permanent magnet inside.

3. The grinder and tool rest system of claim 1, further comprising:
    a grinder bracket;
    a cable hanger slidable over a pin and further having a locking screw; and
    a part storage, where grinder bracket is mounted on the platform of the height-and-angle adjustable arm and where the part storage is mounted on the anti-tipping plate.

4. A grinder and tool rest system, comprising
    a magnetic base;
    a height-and-angle adjustable arm;
    a platform connected to a top end of the height-and-angle adjustable arm;
    a torch bracket connected to a top end of the platform;
    a cable hanger slidable over a pin and further having a locking screw; and
    a vertical screw, where
    the vertical screw is placed through bottom hole of the height-and-angle adjustable arm, and is secured into a threaded hole in the top center point on the magnetic base and where the height and angle of the platform are adjusted by a lower screw and a higher screw.

5. The grinder and tool rest system of claim 4, wherein the magnetic base further comprising a round cup made of ferromagnetic material, a cover plate made of non-magnetic material, a layer of adhesive material and a donut-shaped permanent magnet inside.

* * * * *